United States Patent
Shimizu et al.

[11] Patent Number: 5,893,426
[45] Date of Patent: Apr. 13, 1999

[54] CABLE-TYPE STEERING DEVICE

[75] Inventors: Yasuo Shimizu; Hiroshi Tabata; Shigeki Ehara, all of Saitama, Japan

[73] Assignee: Honda Giken Kogyo Kabushiki Kaisha, Tokyo, Japan

[21] Appl. No.: 09/064,617

[22] Filed: Apr. 23, 1998

[30] Foreign Application Priority Data

Apr. 23, 1997 [JP] Japan ................. 9-106334

[51] Int. Cl.⁶ .................. B62D 1/00; B62D 5/00
[52] U.S. Cl. ................. 180/400; 180/443
[58] Field of Search ................. 180/444, 400, 180/443, 402, 771, 425

[56] References Cited

U.S. PATENT DOCUMENTS

| | | | |
|---|---|---|---|
| 3,605,932 | 9/1971 | Wilfert et al. | 180/428 |
| 4,023,434 | 5/1977 | Axelsson | 74/496 |
| 5,408,945 | 4/1995 | Bohlin | 114/144 R |

FOREIGN PATENT DOCUMENTS 8-2431  1/1996  Japan .

Primary Examiner—Robert J. Oberleitner
Assistant Examiner—Faye M. Fleming
Attorney, Agent, or Firm—Armstrong, Westerman, Hattori, McLeland & Naughton

[57] ABSTRACT

A cable-type steering device for controlling operation of a power-steering motor in accordance with the tension on stranded metal wire cables which connect a vehicle steering wheel to a steering gearbox. Tensions of the cables are detected by contact with an arm of a potentiometer. The surfaces of the cables are smoothed by a swaging treatment or resin coating treatment to prevent undesirable vibrations of the arm of the potentiometer and improve the detection accuracy of the potentiometer. The smoothing treatment eliminates undesirable vibration which might otherwise occur due to irregularity of the surface of untreated stranded metal wire cable.

4 Claims, 6 Drawing Sheets

5i(6i)

5i(6i)

CABLE-TYPE STEERING DEVICE

BACKGROUND OF THE INVENTION

1. Field of the Invention

The present invention relates to a cable-type steering device for a vehicle in which a steering wheel and a steering gearbox are connected to each other by a flexible cable such as a Bowden cable.

2. Description of the Related Art

In the case of a conventional steering device for a vehicle, the bottom end of a steering shaft having a steering wheel at its top end is connected to a steering gearbox to transmit a steering torque input to the steering wheel to a rack-and-pinion mechanism set in the steering gearbox through the steering shaft.

However, when connecting the steering wheel with the steering gearbox by the steering shaft, certain design problems occur. For example, the degree of freedom for design is greatly limited. Moreover, the steering gearbox cannot be used commonly in a right-hand steered vehicle and a left-hand steered vehicle because it is difficult to freely select a position of the steering wheel relative to the steering gearbox. Moreover, because vibrations inputted to tires from the surface of a road and vibrations of an engine are inputted to the steering wheel through the steering shaft, comfort problems are experienced in that the silence within a vehicle compartment and the riding comfort of the vehicle deteriorate.

Therefore, a cable-type steering device has been proposed in Japanese Patent Application Laid-Open No. 8-2431) which uses a flexible transmission means such as a Bowden cable instead of a conventional steering shaft. With the proposed device it is possible to freely select a position of the steering wheel relative to the steering gearbox and the above comfort problems are minimized because road vibrations and vibrations of the steering gearbox are not readily transmitted to the steering wheel.

When combining a cable-type steering device with an electric power steering device, it is possible to assist the driver's steering by detecting a steering torque input to a steering wheel and driving an actuator of the electric power steering device in response to the steering torque so detected. To detect the steering torque in accordance with the tension of a cable, it is necessary to move a detection member of a tension detection means into contact with the cable. However, because the cable of a cable-type steering device is generally a stranded metal wire having a high strength, a problem occurs when the cable slides while contacting the detection member. That is, the detection member finely vibrates due to irregularity of the surface of the cable which varies and disrupts the accurate detection of the tension of the cable.

SUMMARY OF THE INVENTION

The present invention is made to solve the above problems and a primary object is to avoid deterioration or fluctuation of the tension detecting accuracy due to the irregularity of a stranded metal wire cable surface.

To achieve the above object, the cable-type steering device of the present invention transmits steering torque input to a vehicle steering wheel to a steering gearbox through cables formed with a stranded metal wire. A power assist means is operated in accordance with the output of a tension detection means for detecting the tension of the cables by bringing a tension detection member into contact with the cables. A smoothing treatment is applied to at least a portion of each cable which contacts the tension detection member to eliminate undesirable vibration of the tension detection member.

According to the above structure, when the cable formed with the stranded metal wire slides while contacting the tension detection member, the tension detection member does not vibrate due to irregularity of the cable surface because the smoothing treatment is applied to the cable and therefore, it is possible to accurately detect the cable tension.

Moreover, it is possible to easily smooth a cable using a swaging treatment or by coating the cable with a synthetic resin coating.

DESCRIPTION OF THE PREFERRED EMBODIMENTS

Modes for carrying out the present invention are described below in accordance with embodiments of the present invention shown in the accompanying drawings.

FIGS. 1 to 4 illustrate a first embodiment of the present invention.

Figure 1:
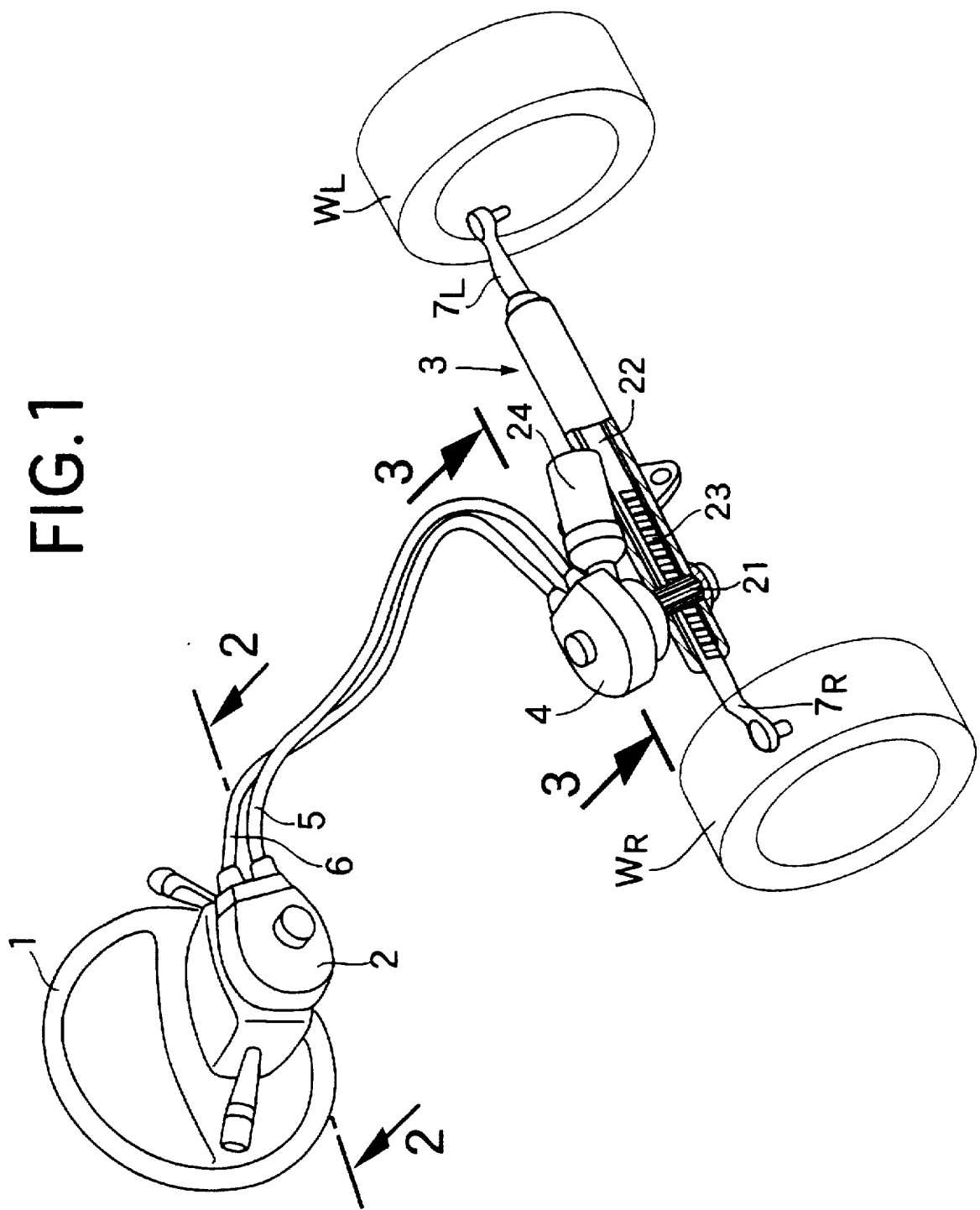
FIG. 1 is a general perspective view of a cable-type steering device.

As shown in FIG. 1, a driving-pulley housing 2 set to the front of a steering wheel 1 of a vehicle is connected with a driven-pulley housing 4 set above a steering gearbox 3 by two Bowden wires 5, 6. Tie rods $7_R$, $7_L$, which extend in the right and left directions of a vehicle chassis from the ends of the steering gearbox 3, are connected to knuckles (not illustrated) for supporting right and left steering wheels $W_R$, $W_L$.

Figure 2:
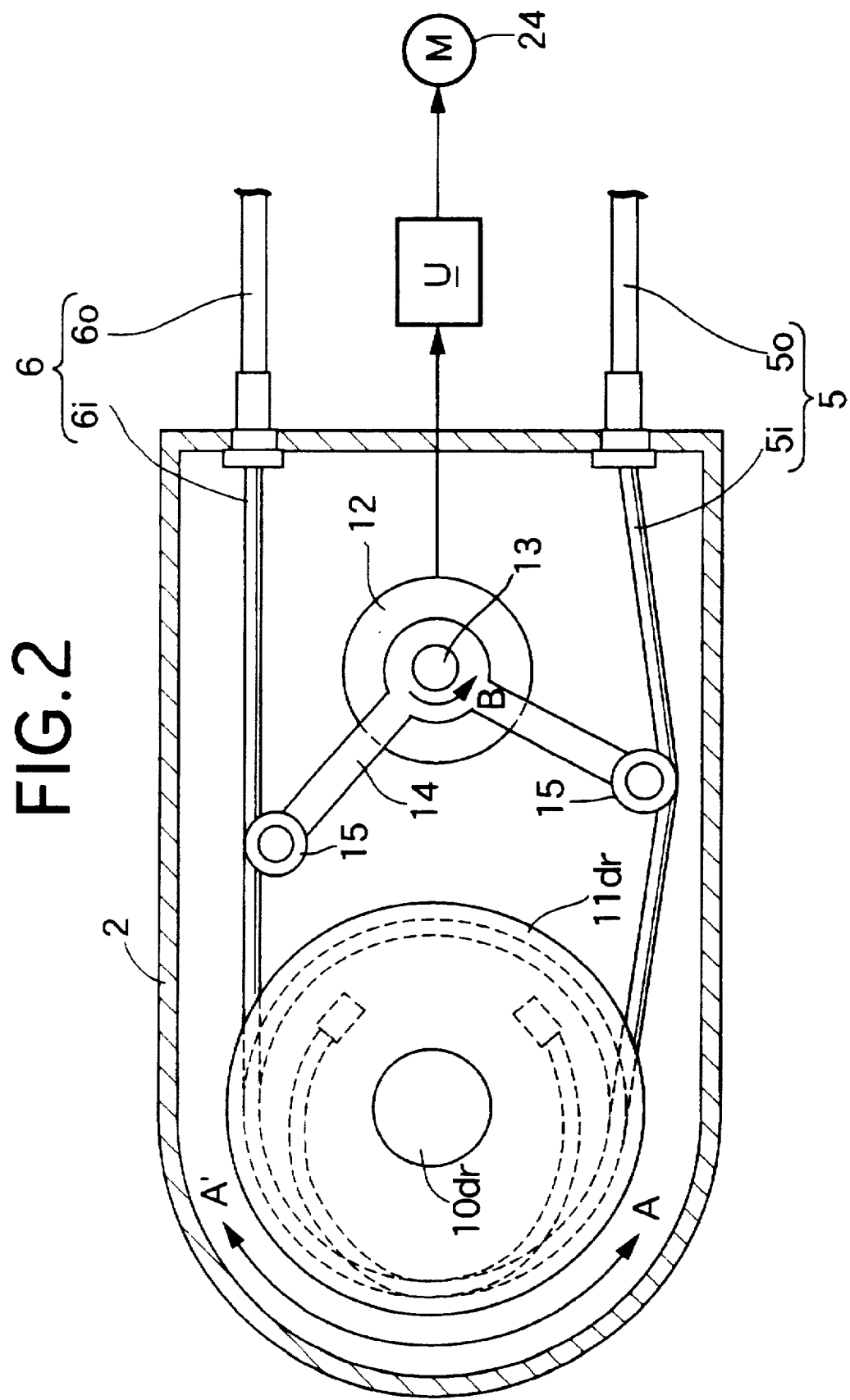
FIG. 2 is an enlarged sectional view taken along line 2—2 in FIG. 1.

As shown in FIG. 2, a driving pulley 11*dr* is secured to a rotary shaft 10*dr* rotatably supported by the driving-pulley housing 2 for rotation with the steering wheel 1. Two Bowden cables 5, 6 comprise outer tubes 5*o*, 6*o* and inner cables 5*i*, 6*i* slidably received in the tubes 5*o*, 6*o*. One end of each of the inner cables 5*i*, 6*i* is wound on a spiral pulley groove formed on the outer periphery of the driving pulley 11*dr* a plurality of times to be secured thereto and a corresponding end of each of the outer tubes 5*o*, 6*o* is secured to the driving pulley housing 2.

A potentiometer 12 is set in the driving-pulley housing 2 so as to be held between the two inner cables 5*i*, 6*i*. A pair of rollers 15, 15 contacting the two inner cables 5*i*, 6*i* respectively are rotatably supported at the ends of a V-shaped arm 14 secured to a detection shaft 13 of the potentiometer 12. The spacing or distance between the rollers 15, 15 is set to a value slightly larger than the diameter of the driving pulley 11*dr*. Therefore, even if the detection shaft 13 of the potentiometer 12 rotates, both rollers 15, 15 are maintained in contact with both inner cables 5*i*, 6*i*. The potentiometer 12 constitutes a tension detection means of the present invention and the rollers 15, 15 provided on arm 14 constitute a tension detection member of the present invention.

Figure 3:
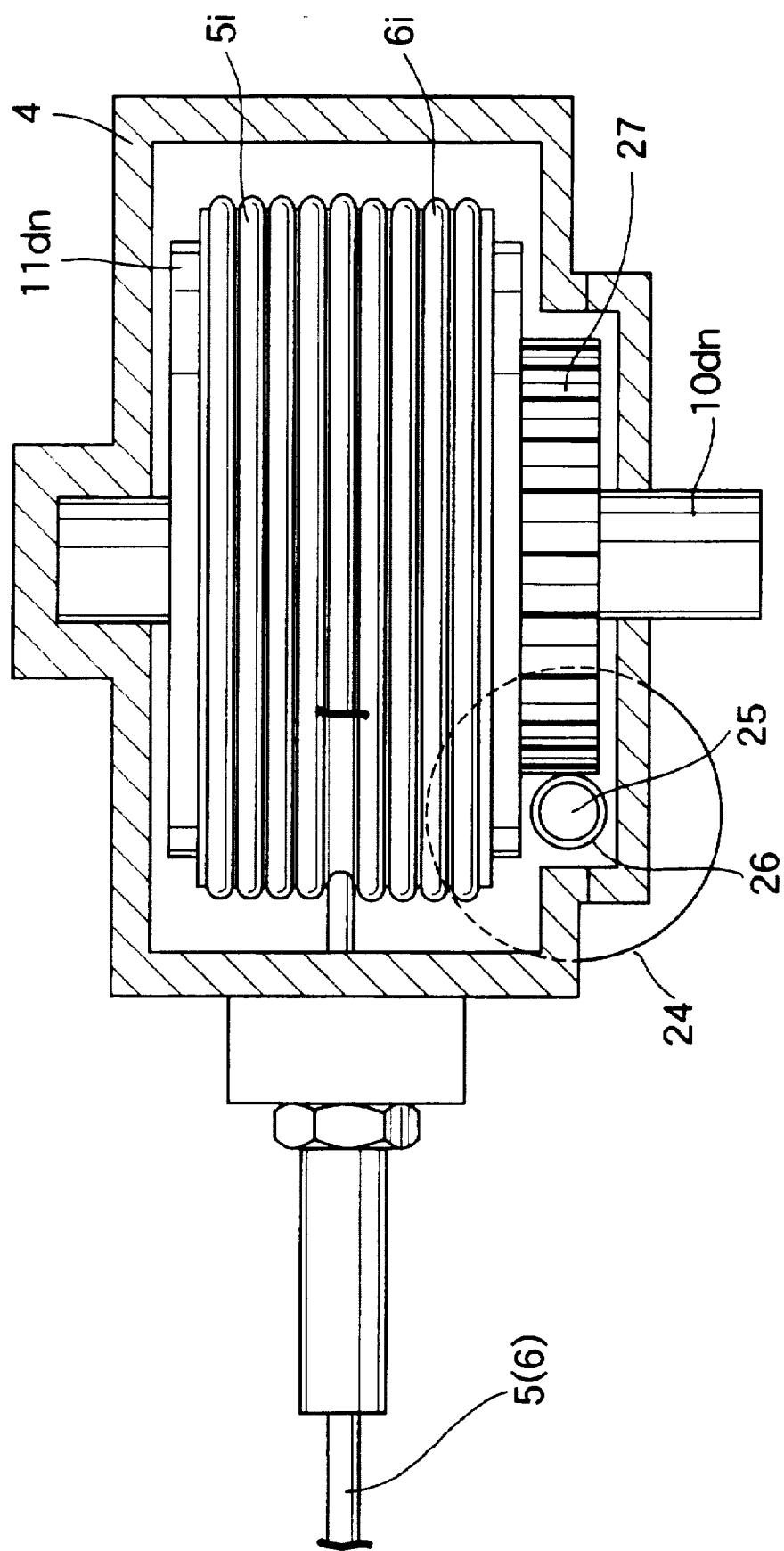
FIG. 3 is an enlarged sectional view taken along line 3—3 in FIG. 1.

As shown in FIGS. 1 and 3, a driven pulley 11$dn$ is secured to a rotary shaft 10$dn$ rotatably supported by the driven-pulley housing 4. The other ends of the inner cables 5$i$, 6$i$ are secured by being wound on a spiral pulley groove formed on the outer periphery of the driven pulley 11$dn$ a plurality of times, and the corresponding other ends of the outer tubes 5$o$, 6$o$ of the Bowden cables 5, 6 are secured to the driven-pulley housing 4. A pinion 21 is provided at a forward end of the rotary shaft 10$dn$ which protrudes inside the steering gearbox 3 where the pinion 21 engages with a rack 23 formed on a steering rod 22 slidably supported in the steering gearbox 3 for reciprocating movement toward the right and left wheels $W_R$, $W_L$.

A power-steering motor 24 serving as the power assist means is supported by the driven pulley housing 4. A worm 26 secured to an output shaft 25 of motor 24 engages in the driven pulley housing 4 with a worm wheel 27 secured to the rotary shaft 10$dn$. Therefore, the torque of the power-steering motor 24 is transmitted to the rotary shaft 10$dn$ through the worm 26 and worm wheel 27.

Figure 4A:
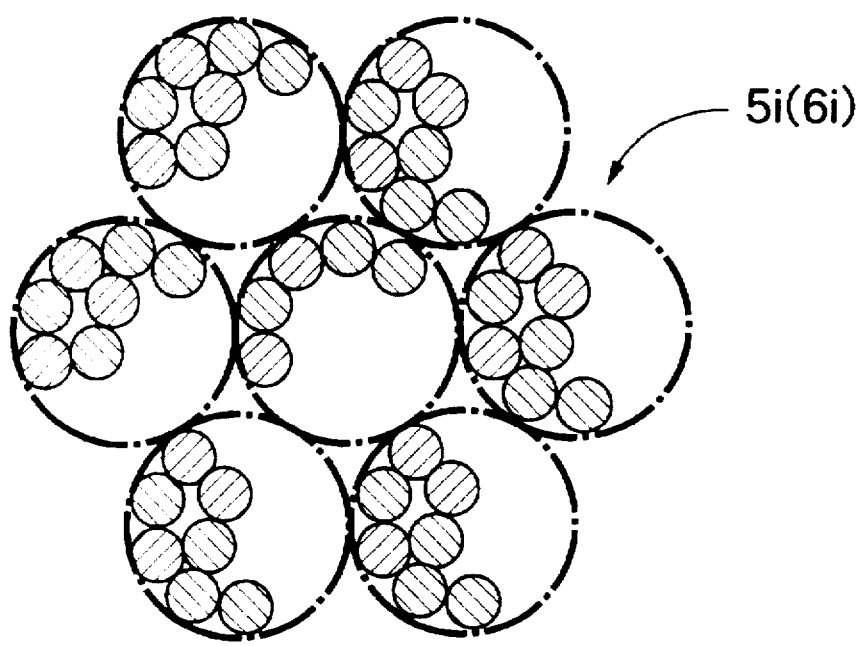
FIGS. 4A and 4B are diagrammatic sectional views of inner cables.

FIG. 4A diagrammatically illustrates a sectional view of a typical stranded metal wire generally used as the material of the inner cables 5$i$, 6$i$ of the Bowden cables 5, 6. The material of the inner cables 5$i$, 6$i$ is made by manufacturing a stranded wire by bundling and stranding a number of thin metallic wires to form strand wires and, then bundling and stranding seven stranded wires to form a cable. The surfaces of the inner cables 5$i$, 6$i$ are not smooth because of fine waviness and protrusion of frayed metallic slivers on the surface.

Therefore, when the inner cables 5$i$, 6$i$ formed of a typical stranded metal wire slide while contacting the rollers 15, 15, the arm 14 finely vibrates and the output of the potentiometer 12 fluctuates. Therefore, the torque applied by the power-steering motor 24 fluctuates and undesirable vibrations may be induced in the steering system.

Figure 4B:
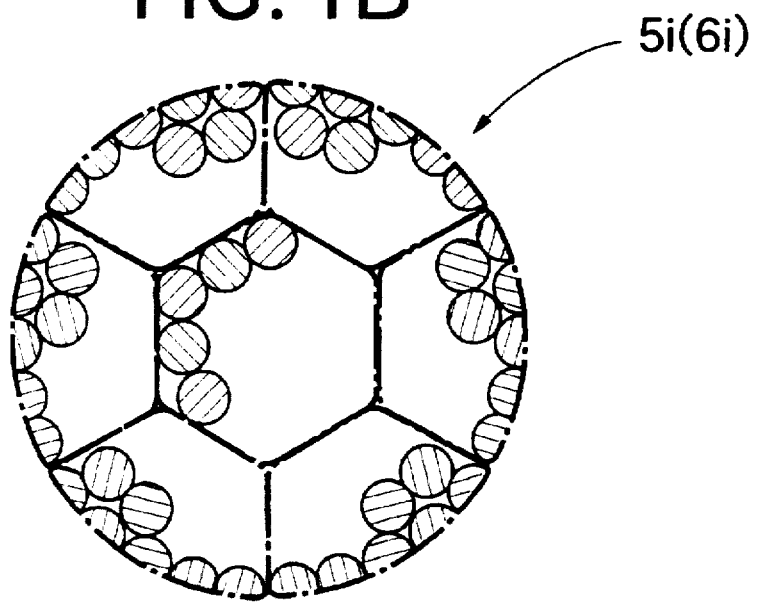

Therefore, in this embodiment, as shown in FIG. 4B, by applying a swaging treatment to the inner cables 5$i$, 6$i$ as a smoothing treatment, the surface of the stranded metal wire cable is smoothed to prevent fluctuations in the output of the potentiometer 12. The swaging treatment decreases the diameters of the inner cables 5$i$, 6$i$ by applying a pressure to the surfaces of the cables 5$i$, 6$i$ and deforming the cross sections of the cables 5$i$, 6$i$ so as to become almost circular. The outer surfaces of the inner cables 5$i$, 6$i$ are smoothed during the swaging treatment.

Then, operation of the first embodiment of the present invention using inner cables 5$i$, 6$i$ having the above swaged structure will now be described.

When rotating the rotary shaft 10$dr$ in the direction of the arrow A in FIG. 2 by operating the steering wheel 1 in order to turn a vehicle, one inner cable 6$i$ of the Bowden cables 5, 6 wound on the driving pulley 11$dr$ is pulled and the other inner cable 5$i$ is loosened and thereby, the rotation of the driving pulley 11$dr$ is transmitted to the driven pulley 11$dn$. As a result, the rotary shaft 10$dn$ shown in FIG. 3 rotates and a steering torque is transmitted to the wheels $W_R$, $W_L$ through the pinion 21, the rack 23 and the steering rod 22 in the steering gearbox 3.

Moreover, when the tension of one inner cable 6$i$ increases and that of the other inner cable 5$i$ decreases, the arm 14 connected to the inner cables 5$i$, 6$i$ through the rollers 15, 15 rotates together with the detection shaft 13 in the direction of the arrow B in FIG. 2 and the rotation angle of the arm 14 is detected by the potentiometer 12. The steering torque inputted to the steering wheel 1 is proportional to the tension difference between the inner cables 5$i$, 6$i$ and the rotation angle of the detection shaft 13 of the potentiometer 12 is also proportional to the tension difference. Therefore, it is possible to detect the steering torque in accordance with the output of the potentiometer 12.

The steering torque thus detected is computed in an electronic control unit U together with other control signals including a vehicle speed signal and a steering assist torque generated by the power-steering motor 24 is feedback-controlled so that the tension difference between the inner cables 5$i$, 6$i$ becomes almost constant. Therefore, when the power-steering motor 24 generates a torque, the rotary shaft 10$dn$ is rotated through the worm 26 and the worm wheel 27 to power assist during the driver's operation of the steering wheel 1.

Also by rotating the steering wheel 1 in the direction of the arrow AN in FIG. 2, it is possible to detect the steering torque of the steering wheel 1 in a manner similar to the case of rotating the steering wheel 1 in the direction of the arrow A as described above.

As also described above, when the swaged and smooth inner cables 5$i$, 6$i$ slide while contacting the rollers 15, 15, undesirable vibration of the arm 14 connected to the inner cables 5$i$, 6$i$ through the rollers 15, 15 is prevented and the output of the potentiometer 12 is stabilized because the swaging treatment has been applied to smooth the surfaces of the inner cables 5$i$, 6$i$. As a result, undesirable fluctuation of the torque of the power-steering motor 24 is prevented and the problem of transmitting undesirable vibration to the steering wheel 1 is eliminated.

The second embodiment of the present invention will now be described with reference to FIGS. 4 and 5.

The second embodiment is characterized by using an alternate mechanism for transmitting tensions of the inner cables 5$i$, 6$i$ to a potentiometer 12 and an alternate method of smoothing the inner cables 5$i$, 6$i$. Otherwise, the overall structure of the cable-type steering device of the second embodiment is similar to that of the first embodiment.

Figure 5:
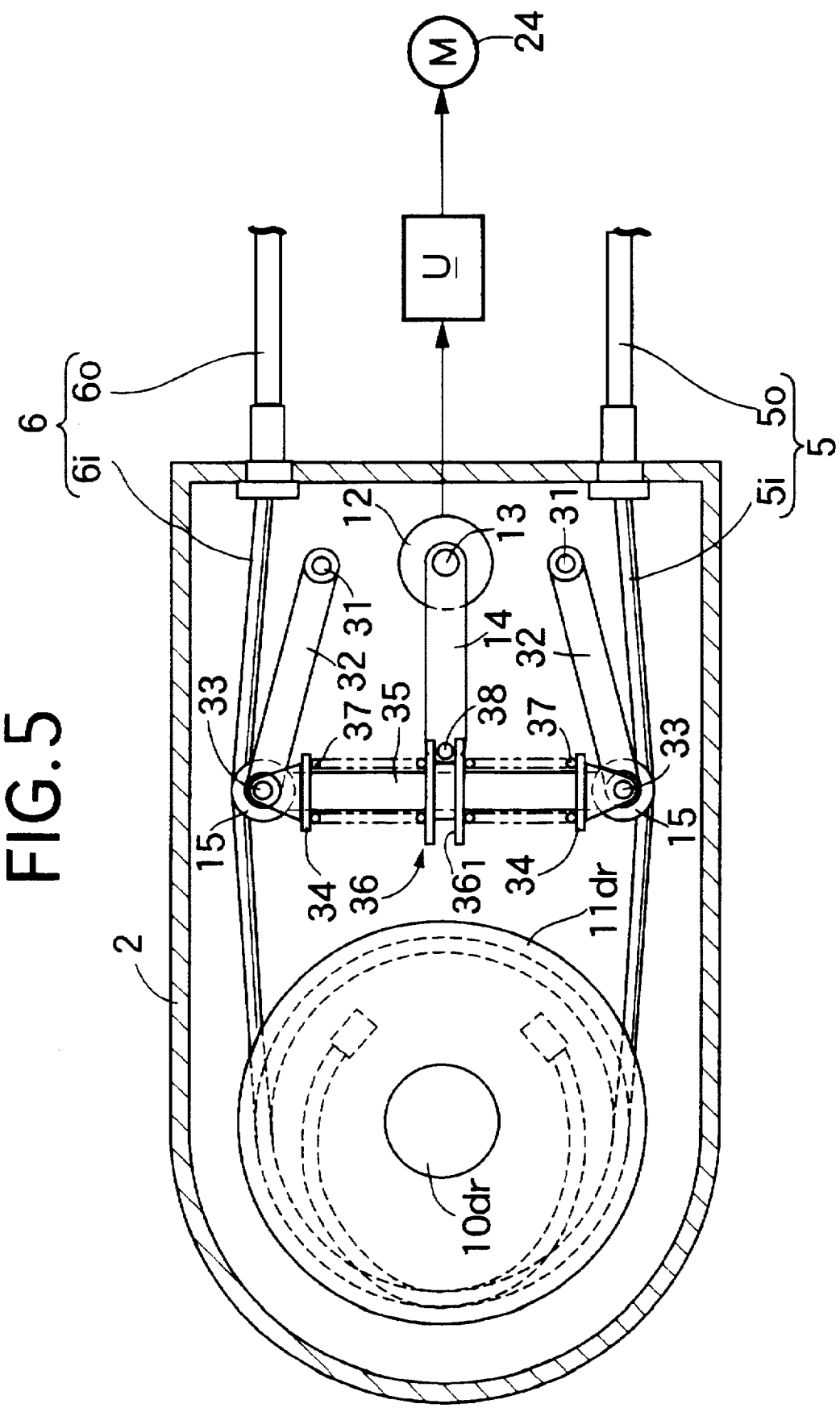
FIG. 5 is an enlarged sectional view similar to FIG. 2, and illustrating a second embodiment of the present invention.

As shown in FIG. 5, proximal ends of a pair of links 32, 32 are rotatably supported by pins 31, 31 so as to hold the potentiometer 12 at the center of a driving-pulley housing 2. Rollers 15, 15 are rotatably supported on pins 33, 33 carried by roller holders 34, 34 at the other or front ends of the links 32, 32. The roller holders 34, 34 are connected by a connection rod 35 to form an integral body. Therefore, the two links 32, 32 and the connection rod 35 constitute a four-node link mechanism using four pins 31, 31, 33 and 33 as fulcrums and the connection rod 35 is supported so as to be movable in a direction along its longitudinal axis.

A collar 36 provided with an annular groove 36, is slidably supported at the center of the connection rod 35. A pair of centering springs 37, 37 for pressing the collar 36 to the central position of the connection rod 35 are set between each of the roller holders 34, 34 on one hand and the collar 36 on the other. A guide pin 38 is secured at one end of an arm 14 having a second end secured to a detection shaft 13 of the potentiometer 12. The guide pin 38 is fitted to the annular groove 36$_1$ of the collar 36.

Figure 6:
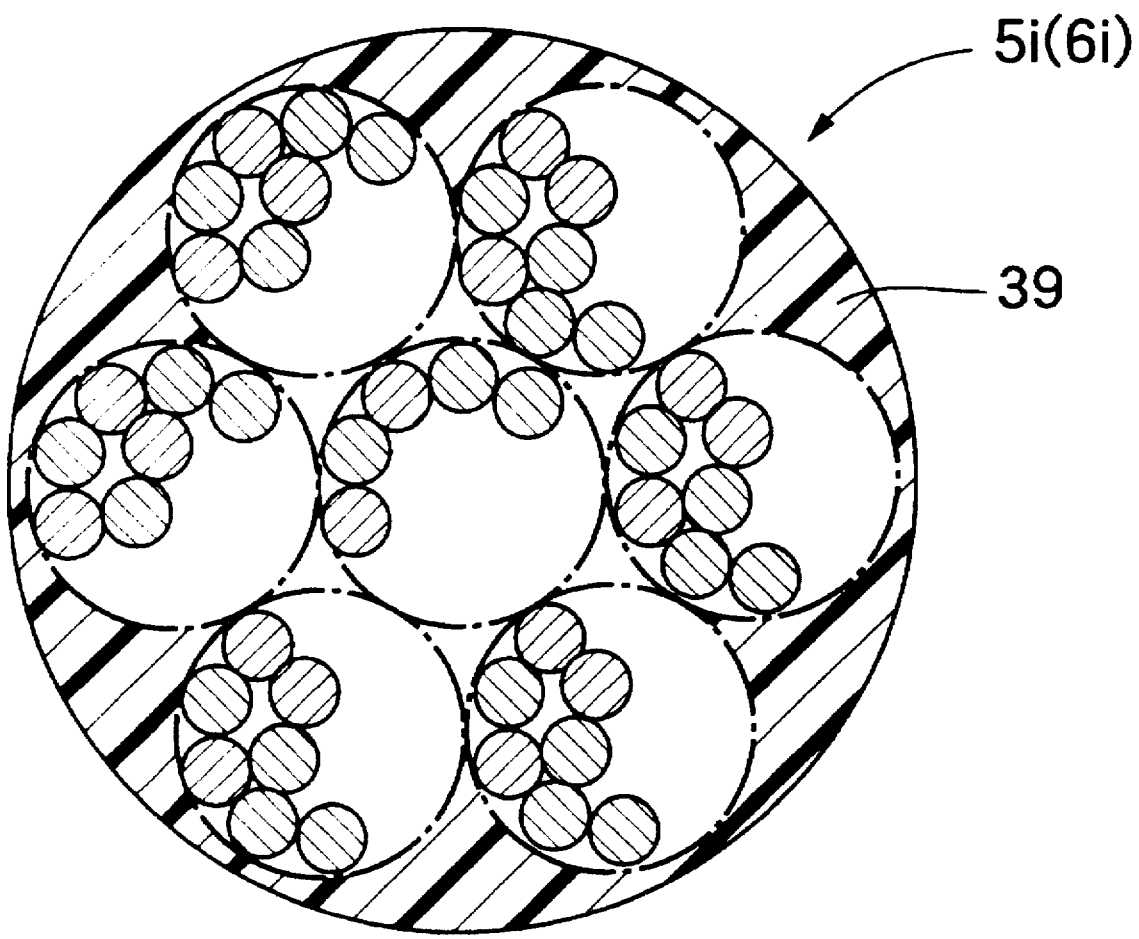
FIG. 6 is a diagrammatic sectional view of an inner cable.

As shown in FIG. 6, the inner cables 5$i$, 6$i$ of the second embodiment of the invention are smoothed by coating the surfaces of the materials of the inner cables 5$i$, 6$i$ with a soft synthetic resin 39.

Thus, according to the second embodiment, when the tension of one inner cable 6$i$ increases and that of the other inner cable 5i decreases by operating the steering wheel 1, the links 32, 32 both rotate about the pins 31, 31 and, thereby, the connection rod 35 moves in a longitudinal direction. As a result, the arm 14 whose guide pin 38 is pushed by the collar 36 held by the centering springs 37, 37 at the central portion of the connection rod 35 rotates with the detection shaft 13 and the steering torque can be detected by detecting the rotation of the arm 14 by the potentiometer 12.

When the inner cables 5i, 6i slide while contacting the rollers 15, 15, the output of the potentiometer 12 is stabilized because the surfaces of the inner cables 5i, 6i are smoothed by the resin coating treatment, thus avoiding vibrations of the rollers 15, 15 which would otherwise be encountered with untreated stranded metal wire having a rough, uneven surface. In this embodiment, even if the rollers 15, 15 and the connection rod 35 connected to the rollers 15, 15 slightly vibrate, the vibrations of the connection rod 35 are absorbed by the centering springs 37, 37 which further stabilize the output of the potentiometer 12 because the collar 36 connected to the arm 14 of the potentiometer 12 is floating relative to the connection rod 35 and biased by the centering springs 37, 37.

The preferred embodiments of the present invention are described above in detail. However, modifications may be made without deviating from the present invention as defined by the claims appended hereto.

For example, in the above-described embodiments, it is contemplated that the smoothing treatment is applied to the overall length of the inner cables 5i, 6i. However, it is also possible to apply the smoothing treatment only to those potions of the cables 5i, 6i which will contact the rollers 15, 15. Moreover, it is also possible to directly drive the steering rod 22 through a ball screw mechanism by the rotor of the power-steering motor 24 by coaxially providing the motor 24 in the steering gearbox 3. In this case, it is also possible to directly drive the rotor of the power-steering motor 24 by the inner cables 5i, 6i without the use of a driven pulley such as the driven pulley 11dn as an intermediate driving means.

According to the present invention in a cable-type steering device having a tension responsive power assist motor, it is possible to accurately detect the tension since undesirable vibration of the tension detection member is prevented because the smoothing treatment is applied to at least a portion of the cables formed with a metallic stranded wire which contact a tension detection member when the cables slide while contacting the tension detection member.

Moreover, according to the present invention, it is possible to easily smooth a cable using a swaging treatment or by coating the cables with a synthetic-resin coating.

What is claimed is:

1. A vehicle cable-type steering device with power assist, comprising:

a pair of cables each respectively formed of a stranded metal wire;

one end of each cable being secured for movement in respectively opposite directions in response to a steering torque input to a vehicle steering wheel;

the other end of each cable being secured to means for turning vehicle wheels in response to said steering torque input;

tension detection means having a tension detection member contacting each of said cables to detect tension applied to said cables by said steering torque input;

power assist means for assisting a vehicle operator in turning said vehicle wheels, said power assist means being operatively connected and responsive to said tension detection means; and at least those portions of each of said cables which contact said tension detection member are smoothed to minimize undesirable vibration due to surface irregularities.

2. The vehicle cable-type steering device with power assist according to claim 1, wherein said cables are smoothed to minimize undesirable vibration due to surface irregularities over substantially the entire length of said cables.

3. The vehicle cable-type steering device with power assist according to claim 1, wherein said portions of said cables are smoothed as a result of a swaging treatment.

4. The vehicle cable-type steering device with power assist according to claim 1, wherein said portions of said cables are coated with a synthetic resin coating to minimize said undesirable vibration.

* * * * *